United States Patent
Roos et al.

(10) Patent No.: US 11,604,280 B2
(45) Date of Patent: Mar. 14, 2023

(54) PROCESSING TEMPORAL SEGMENTS OF LASER CHIRPS AND EXAMPLES OF USE IN FMCW LIDAR METHODS AND APPARATUSES

(71) Applicant: Bridger Photonics, Inc., Bozeman, MT (US)

(72) Inventors: Peter Aaron Roos, Bozeman, MT (US); Michael James Thorpe, Bozeman, MT (US); Jason Kenneth Brasseur, Bozeman, MT (US)

(73) Assignee: Bridger Photonics, Inc., Bozeman, MT (US)

(*) Notice: Subject to any disclaimer, the term of this patent is extended or adjusted under 35 U.S.C. 154(b) by 439 days.

(21) Appl. No.: 16/753,314

(22) PCT Filed: Oct. 2, 2018

(86) PCT No.: PCT/US2018/054016
§ 371 (c)(1),
(2) Date: Apr. 2, 2020

(87) PCT Pub. No.: WO2019/070751
PCT Pub. Date: Apr. 11, 2019

(65) Prior Publication Data
US 2020/0241139 A1  Jul. 30, 2020

Related U.S. Application Data (60) Provisional application No. 62/567,052, filed on Oct. 2, 2017.

(51) Int. Cl.
*G01S 17/34* (2020.01)

(52) U.S. Cl.
CPC .................................. *G01S 17/34* (2020.01)

(58) Field of Classification Search
CPC ..... G01S 17/06; G01S 17/34; G01B 9/02007; G01B 9/02008
See application file for complete search history.

(56) References Cited

U.S. PATENT DOCUMENTS 3,925,666 A  12/1975 Allan et al.
4,167,329 A  9/1979 Jelalian et al.
(Continued)

FOREIGN PATENT DOCUMENTS

CN  205141361 U  4/2016
WO  2010127151 A2  11/2010
(Continued)

OTHER PUBLICATIONS

U.S. Appl. No. 17/399,106 titled "High-Sensitivity Gas-Mapping 3D Imager and Method of Operation" filed Aug. 12, 2021.
(Continued)

*Primary Examiner* — Michael A Lyons
(74) *Attorney, Agent, or Firm* — Dorsey & Whitney LLP (57) ABSTRACT

Examples of FMCW laser radar systems and methods described herein may segment the processing of a broader bandwidth frequency chirp into multiple shorter-duration (e.g., lower bandwidth) frequency chirps. This segmentation may have the benefits in some examples of improving the measurement duty cycle and range resolution, and/or allowing for more flexible processing, and/or enabling improved detection of more distant objects.

19 Claims, 5 Drawing Sheets

(56) References Cited

U.S. PATENT DOCUMENTS

| | | | |
|---|---|---|---|
| 4,551,004 A | 11/1985 | Paraskevopoulos | |
| 4,593,368 A | 6/1986 | Fridge et al. | |
| 4,732,156 A | 3/1988 | Nakamura | |
| 4,795,253 A | 1/1989 | Sandridge et al. | |
| 4,830,486 A | 5/1989 | Goodwin | |
| 5,115,468 A | 5/1992 | Asahi et al. | |
| 5,294,075 A | 3/1994 | Vertatschitsch et al. | |
| 5,367,399 A | 11/1994 | Kramer | |
| 5,371,587 A | 12/1994 | De Groot et al. | |
| 5,534,993 A | 7/1996 | Ball et al. | |
| 5,548,402 A | 8/1996 | Nogiwa | |
| 5,768,001 A | 6/1998 | Kelley et al. | |
| 5,859,694 A | 1/1999 | Galtier et al. | |
| 6,034,976 A | 3/2000 | Mossberg et al. | |
| 6,516,014 B1 | 2/2003 | Sellin et al. | |
| 6,822,742 B1 | 11/2004 | Kalayeh et al. | |
| 6,864,983 B2 | 3/2005 | Galle et al. | |
| 7,215,413 B2 | 5/2007 | Soreide et al. | |
| 7,292,347 B2 | 11/2007 | Tobiason et al. | |
| 7,511,824 B2 | 3/2009 | Sebastian et al. | |
| 7,742,152 B2 | 6/2010 | Hui et al. | |
| 7,920,272 B2 | 4/2011 | Sebastian et al. | |
| 8,010,300 B1 | 8/2011 | Stearns et al. | |
| 8,121,798 B2 | 2/2012 | Lippert et al. | |
| 8,175,126 B2 | 5/2012 | Rakuljic et al. | |
| 8,294,899 B2 | 10/2012 | Wong | |
| 8,582,085 B2 | 11/2013 | Sebastian et al. | |
| 8,730,461 B2 | 5/2014 | Andreussi | |
| 8,781,755 B2 | 7/2014 | Wong | |
| 8,913,636 B2 | 12/2014 | Roos et al. | |
| 9,030,670 B2 | 5/2015 | Warden et al. | |
| 9,098,754 B1 | 8/2015 | Stout et al. | |
| 9,559,486 B2 | 1/2017 | Roos et al. | |
| 9,696,423 B2 | 7/2017 | Martin | |
| 9,759,597 B2 | 9/2017 | Wong | |
| 9,784,560 B2 | 10/2017 | Thorpe et al. | |
| 9,864,060 B2 | 1/2018 | Sebastian et al. | |
| 9,970,756 B2 | 5/2018 | Kreitinger et al. | |
| 10,247,538 B2 | 4/2019 | Roos et al. | |
| 2002/0071122 A1 | 6/2002 | Kulp et al. | |
| 2003/0043437 A1 | 3/2003 | Stough et al. | |
| 2004/0088113 A1 | 5/2004 | Spoonhower et al. | |
| 2004/0105087 A1 | 6/2004 | Gogolla et al. | |
| 2005/0078296 A1 | 4/2005 | Bonnet | |
| 2005/0094149 A1 | 5/2005 | Cannon | |
| 2006/0050270 A1 | 3/2006 | Elman | |
| 2006/0162428 A1 | 7/2006 | Hu et al. | |
| 2006/0203224 A1 | 9/2006 | Sebastian et al. | |
| 2008/0018881 A1 | 1/2008 | Hui et al. | |
| 2008/0018901 A1 | 1/2008 | Groot | |
| 2009/0046295 A1 | 2/2009 | Kemp et al. | |
| 2009/0153872 A1 | 6/2009 | Sebastian et al. | |
| 2009/0257622 A1 | 10/2009 | Wolowelsky et al. | |
| 2010/0007547 A1 | 1/2010 | D'Addio | |
| 2010/0091278 A1 | 4/2010 | Liu et al. | |
| 2010/0131207 A1 | 5/2010 | Lippert et al. | |
| 2010/0141261 A1 | 6/2010 | Overby et al. | |
| 2011/0069309 A1 | 3/2011 | Newbury et al. | |
| 2011/0164783 A1 | 7/2011 | Hays et al. | |
| 2011/0188029 A1 | 8/2011 | Schmitt et al. | |
| 2011/0205523 A1 | 8/2011 | Rezk et al. | |
| 2011/0213554 A1 | 9/2011 | Archibald et al. | |
| 2011/0273699 A1 | 11/2011 | Sebastian et al. | |
| 2011/0292403 A1 | 12/2011 | Jensen et al. | |
| 2012/0106579 A1 | 5/2012 | Roes et al. | |
| 2012/0274938 A1 | 11/2012 | Ray | |
| 2012/0293358 A1 | 11/2012 | Itoh | |
| 2013/0104661 A1 | 5/2013 | Klotz et al. | |
| 2014/0002639 A1 | 1/2014 | Cheben et al. | |
| 2014/0036252 A1 | 2/2014 | Amzajerdian et al. | |
| 2014/0139818 A1 | 5/2014 | Sebastian et al. | |
| 2014/0204363 A1 | 7/2014 | Slotwinski et al. | |
| 2015/0019160 A1 | 1/2015 | Thurner et al. | |
| 2015/0185313 A1 | 7/2015 | Zhu | |
| 2015/0355327 A1 | 12/2015 | Goodwin et al. | |
| 2016/0123718 A1 | 5/2016 | Roos et al. | |
| 2016/0123720 A1 | 5/2016 | Thorpe et al. | |
| 2016/0131514 A1 | 5/2016 | Babin et al. | |
| 2016/0202225 A1 | 7/2016 | Feng et al. | |
| 2016/0259038 A1 | 9/2016 | Retterath et al. | |
| 2016/0261091 A1 | 9/2016 | Santis et al. | |
| 2017/0089829 A1 | 3/2017 | Bartholomew | |
| 2017/0097274 A1 | 4/2017 | Thorpe et al. | |
| 2017/0097302 A1 | 4/2017 | Kreitinger et al. | |
| 2017/0115218 A1 | 4/2017 | Huang et al. | |
| 2017/0131394 A1 | 5/2017 | Roger et al. | |
| 2017/0146335 A1 | 5/2017 | Martinez et al. | |
| 2017/0168161 A1 | 6/2017 | Shapira et al. | |
| 2017/0171397 A1 | 6/2017 | Mitsumori et al. | |
| 2017/0191898 A1 | 7/2017 | Rella et al. | |
| 2017/0343333 A1 | 11/2017 | Thorpe et al. | |
| 2018/0188369 A1 | 7/2018 | Sebastian et al. | |
| 2018/0216932 A1 | 8/2018 | Kreitinger et al. | |
| 2018/0224548 A1* | 8/2018 | Hariyama | G01S 17/36 |
| 2019/0170500 A1 | 6/2019 | Roos et al. | |
| 2019/0285409 A1 | 9/2019 | Kreitinger et al. | |
| 2019/0383596 A1 | 12/2019 | Thorpe et al. | |
| 2020/0011994 A1 | 1/2020 | Thorpe et al. | |
| 2020/0149883 A1 | 5/2020 | Thorpe et al. | |
| 2020/0182679 A1* | 6/2020 | Maleki | G01S 17/58 |
| 2021/0055180 A1 | 2/2021 | Thorpe et al. | |
| 2021/0190953 A1 | 6/2021 | Roos et al. | |

FOREIGN PATENT DOCUMENTS

| | | |
|---|---|---|
| WO | 2014088650 A1 | 6/2014 |
| WO | 2016064897 A1 | 4/2016 |
| WO | 2017187510 A1 | 11/2017 |
| WO | 2018170478 | 9/2018 |
| WO | 2019060901 A1 | 3/2019 |
| WO | 2019070751 A1 | 4/2019 |
| WO | 2019079448 A1 | 4/2019 |
| WO | 2019099567 | 5/2019 |

OTHER PUBLICATIONS

U.S. Appl. No. 16/966,451 titled "Apparatuses and Methods for Gas Flux Measurements" filed Jul. 30, 2020.

International Search Report and Written Opinion dated Nov. 30, 2018 for PCT Application No. PCT/US2018/054016, 18 pages.

U.S. Appl. No. 16/734,769 titled "Gas-Mapping 3D Imager Measurement Techniques and Method of Data Processing" filed Jan. 6, 2020.

U.S. Appl. No. 15/285,787, entitled "Gas-Mapping 3D Imager Measurement Techniques and Method of Data Processing", filed Oct. 5, 2016.

U.S. Appl. No. 15/680,076, entitled "Length Metrology Apparatus and Methods for Suppressing Phase Noise-Induced Distance Measurement Errors", filed Aug. 17, 2017, pp. all.

U.S. Appl. No. 15/936,247, titled "High-Sensitivity Gas-Mapping 3D Imager and Method of Operation", filed Mar. 26, 2018.

U.S. Appl. No. 16/551,075 titled "Length Metrology Apparatus and Methods for Suppressing Phase Noise-Induced Distance Measurement Errors" filed Aug. 26, 2019.

Amann, et al., ""Laser ranging: a critical review of usual techniques for distance measurement," Optical Engineering. vol. 40(1) pp. 10-19 (Jan. 2001)".

Barber, et al., ""Accuracy of Active Chirp Linearization for Broadband Frequency Modulated Continuous Wave Ladar," Applied Optics, vol. 49, No. 2, pp. 213-219 (Jan. 2010)".

Barker, , ""Performance enhancement of intensity-modulated laser rangefinders on natural surfaces"", SPIE vol. 5606, pp. 161-168 (Dec. 2004).

Baumann, et al., ""Speckle Phase Noise in Coherent Laser Ranging: Fundamental Precision Limitations," Optical Letters, vol. 39, Issue 16, pp. 4776-4779 (Aug. 2014)".

Boashash, , ""Estimating and Interpreting the Instantaneous Frequency of a Signal—Part 2: Algorithms and Applications"", Proceedings of the IEEE, vol. 80, No. 4, pp. 540-568 (Apr. 1992).

(56) References Cited

OTHER PUBLICATIONS

Bomse, et al., ""Frequency modulation and wavelength modulation spectroscopies: comparison of experimental methods using a lead-salt diode laser"", Appl. Opt., 31, pp. 718-731 (Feb. 1992).
Choma, et al., ""Sensitivity Advantage of Swept Source and Fourier Domain Optical Coherence Tomography," Optical Express, vol. 11, No. 18, 2183 (Sep. 2003)".
Ciurylo, , ""Shapes of pressure—and Doppler-broadened spectral lines in the core and nearwings"", Physical Review A, vol. 58 No. 2, pp. 1029-1039 (Aug. 1998).
Dharamsi, , "A theory of modulation spectroscopy with applications of higher harmonic detection", J. Phys. D: Appl. Phys 29, pp. 540-549 (Jun. 1995;1996) (Retrieved Jan. 16, 2017).
Emran, Bara J. et al., "Low-Altitude Aerial Methane Concentration Mapping", School of Engineering, The University of British Columbia, Aug. 10, 2017, pp. 1-12.
Fehr, et al., ""Compact Covariance Descriptors in 3D Point Clouds for Object Recognition"", 2012 IEEE International Conference on Robotics and Automation, pp. 1793-1798, (May 2012).
Fransson, Karin et al., "Measurements of VOCs at Refineries Using the Solar Occultation Flux Technique", Department of Radio and Space Science, Chalmers University of Technology, 2002, 1-19.
Fujima, et al., ""High-resolution distance meter using optical intensity modulation at 28 GHz"", Meas. Sci. Technol. 9, pp. 1049-1052 (May 1998).
Gilbert, et al., ""Hydrogen Cyanide H13C14N Absorption Reference for 1530 nm to 1565 nm Wavelength Calibration—SRM 2519a"", NIST Special Publication 260-137 2005 ED, 29 pages, (Aug. 2005).
Iiyama, et al., "Linearizing Optical Frequency-Sweep of a Laser Diode for FMCW Reflectometry", Iiyama et al. Journal of Lightwave Technology, vol. 14, No. 2, Feb. 1996.
Iseki, et al., ""A Compact Remote Methane Sensor using a Tunable Diode Laser"", Meas. Sci. Technol., 11, 594, pp. 217-220 (Jun. 2000).
Jia-Nian, et al., ""Etalon effects analysis in tunable diode laser absorption spectroscopy gas concentration detection system based on wavelength modulation spectroscopy"", IEEE SOPO, pp. 1-5 (Jul. 2010).
Johnson, et al., ""Using Spin-Images for Efficient Object Recognition in Cluttered 3D Scenes"", IEEE Transactions on Pattern Analysis and Machine Intelligence, vol. 21, No. 5, 37 pages (Published May 1999).
Karlsson, et al., "Linearization of the frequencysweep of a frequency-modulated continuous-wave semiconductor laser radar and the resulting ranging performance", Christer J. Karlsson et al, Applied Optics, vol. 38, No. 15, May 20, 1999, pp. 3376-3386.
Karmacharya, et al., ""Knowledge guided object detection and indentification in 3D point clouds"", SPIE 9528, 952804-952804-13 (Jun. 2015).
Lenz, Dawn et al., "Flight Testing of an Advanced Airborne Natural Gas Leak Detection System", ITT Industries Space Systems Division, Oct. 2005, all.
Lu, et al., "Differential wavelength-scanning heterodyne interferometer for measuring large step height", Applied Optics, vol. 41, No. 28, Oct. 1, 2002.
Masiyano, et al., ""Use of diffuse reflections in tunable diode laser absorption spectroscopy: implications of laser speckle for gas absorption measurements"", Appl. Phys. B 90, pp. 279-288 (Feb. 2008).
Mather, T.A. et al., "A reassessment of current volcanic emissions from the Central American arc with specific examples from Nicaragua", Journal of Volcanology and Geothermal Research, Nov. 2004, 297-311.
Ngo, et al., ""An isolated line-shape model to go beyond the Voigt profile in spectroscopic databases and radiative transfer codes"", Journal of Quantitative Spectroscopy and Radiative Transfer, 129, pp. 89-100 (Nov. 2013).

Olsovsky, et al., ""Chromatic Confocal Microscopy for Multi-depth Imaging of Epithelial Tissue," Biomedical Optics Express, vol. 4. No.5, pp. 732-740 (May 2013)".
Paffenholz, , ""Direct geo-referencing of 3D point clouds with 3D positioning sensors"", (Doctoral Thesis), Leibniz Universität Hannover, 138 pages (Sep. 2012).
Polyanksy, et al., ""High-Accuracy CO2 Line Intensities Determined from Theory and Experiment"", Physical Review Letters, 114, 5 pages (Jun. 2015).
Rao, , ""Information and the accuracy attainable in the estimatin of statistical parameters"", Bull. Calcutta Math. Soc., 37,pp. 81-89 (1945, reprinted 1992) (Retrieved Jan. 10, 2017).
Riris, et al., ""Airborne measurements of atmospheric methane column abundance using a pulsed integrated-path differential absorption lidar"", Applied Optics, vol. 51, No. 34, pp. 8296-8305 (Dec. 2012).
Roos, et al., "Ultrabroadband optical chirp linearization for precision metrology applications", Optics Letters, vol. 34, Issue 23. pp. 3692-3694 (2009).
Rothman, et al., ""The HITRAN 2008 molecular spectroscopic database"", Journal of Quantitative Spectroscopy & Radiative Transfer, 110, pp. 533-572 (Jul. 2009).
Rusu, et al. , ""Fast Point Feature Histograms (FPFH) for 3D Registration"", IEEE Int. Conf. Robot., pp. 3212-3217 (May 2009).
Sandsten, et al., ""Volume flow calculations on gas leaks imaged with infrared gas-correlation"", Optics Express, vol. 20, No. 18, pp. 20318-20329 (Aug. 2012).
Sheen, et al., "Frequency Modulation Spectroscopy Modeling for Remote Chemical Detection." PNNL 13324 (Sep. 2000).
Silver, , ""Frequency-modulation spectroscopy for trace species detection: theory and comparison among experimental methods"", Appl. Opt., vol. 31 No. 6, pp. 707-717 (Feb. 1992).
Sirat, et al., ""Conoscopic Holography," Optics Letters, vol. 10, No. 1 (Jan. 1985)".
Sivananthan, "Integrated Linewidth Reduction of Rapidly Tunable Semiconductor Lasers" Sivananthan, Abirami, Ph.D., University of California, Santa Barbara, 2013, 206; 3602218.
Stone, et al., ""Performance Analysis of Next-Generation LADAR for Manufacturing, Construction, and Mobility," NISTIR 7117 (May 2004)".
Thoma, Eben D. et al., "Open-Path Tunable Diode Laser Absorption Spectroscopy for Acquisition of Fugitive Emission Flux Data", Journal of the Air & Waste Management Association (vol. 55), Mar. 1, 2012, 658-668.
Twynstra, et al., ""Laser-absorption tomography beam arrangement optimization using resolution matrices"", Applied Optics, vol. 51, No. 29, pp. 7059-7068 (Oct. 2012).
Xi, et al., "Generic real-time uniorm K-space sampling method for high-speed swept-Source optical cohernece tomography", Optics Express, vol. 18, No. 9, pp. 9511-9517 (Apr. 2010).
Zakrevskyy, et al., ""Quantitative calibration- and reference-free wavelength modulation spectroscopy"". Infrared Physics & Technology, 55, pp. 183-190 (Mar. 2012).
Zhao, et al., ""Calibration-free wavelength-modulation spectroscopy based on a swiftly determined wavelength-modulation frequency response function of a DFB laser"", Opt, Exp., vol. 24 No. 2, pp. 1723-1733 (Jan. 2016).
Zhao, Yanzeng et al., "Lidar Measurement of Ammonia Concentrations and Fluxes in a Plume from a Point Source", Cooperative Institute for Research in Environmental Studies, University of Colorado/NOAA (vol. 19). Jan. 2002, 1928-1938.
U.S. Appl. No. 17/858,870 titled "Gas-Mapping 3D Imager Measurement Techniques and Method of Data Processing" filed Jul. 6, 2022, pp. all.
Cao , et al., "Etalon Eifects Analysis in Tunable Diode Laser Absorption Spectroscopy Gas Concentration Detection System Based on Wavelength Modulation Spectroscopy", 2010 Symposium on Photonics and Optoelectronics, 2010, pp. 1-5.

\* cited by examiner

PROCESSING TEMPORAL SEGMENTS OF LASER CHIRPS AND EXAMPLES OF USE IN FMCW LIDAR METHODS AND APPARATUSES

CROSS-REFERENCE TO RELATED APPLICATION(S)

This application is a 35 U.S.C. § 371 National Stage Application of PCT Application No. PCT/US2018/054016, filed Oct. 2, 2018, which claims the benefit under 35 U.S.C. § 119 of the earlier filing date of U.S. Provisional Application Ser. No. 62/567,052 filed Oct. 2, 2017, the entire contents of which are hereby incorporated by reference, in their entirety, for any purposes.

TECHNICAL FIELD

Examples described herein relate to the field of optical distance measurement, including light detection and ranging (LiDAR) systems and methods, such as frequency-modulated continuous-wave (FMCW) LiDAR systems and methods, or and length metrology. Examples of systems and methods which may advantageously process temporal segments of an interference signal are described.

BACKGROUND

FMCW laser radar (ladar) generally refers to a form of coherent laser distance measurement that may use substantially linear frequency modulation of a laser output, which is referred to as a form of frequency 'chirp', to achieve distance measurements. The laser frequency may be directly chirped, or the frequency chirp may be imparted to the laser frequency by a modulator that may be external to the laser. FMCW ladar uses optical heterodyne detection, which can provide quantum-noise-limited measurement signals, and allow measurements with a large dynamic range of signal powers due the square root dependence of the FMCW signal on the scattered optical power received from the target. If desired, direct modulation of the laser output frequency can result in large chirp bandwidths, and therefore, high-resolution distance measurements due to the well-known relationship, $\Delta R = c/2B$, where $\Delta R$ is the range resolution, c is the speed of light and B is the chirp bandwidth. Chirped sideband modulation using an RF chirp and, for instance, an optical modulator, is also possible. Production of highly-linear laser frequency chirps can lead to the achievement of substantially Fourier-limited range peaks, and the realization Cramer-Rao-limited distance measurement precisions ($\sigma \approx \Delta R \sqrt{SNR}$, here SNR is the RF power signal-to-noise ratio of the range measurement).

Existing optical measurement techniques and systems (e.g., existing LiDAR systems) may have degraded signal strength for a range of distance measurements and/or an update rate which may be less frequent than desired in some applications.

SUMMARY

Examples of methods are described herein. An example method may include producing an interference signal from a frequency-modulated continuous wave (FMCW) laser radar system. The interference signal may correspond to a laser chirp over a chirp bandwidth. The method may include processing multiple temporal segments of the interference signal. Each of the multiple temporal segments may correspond to a respective segmented bandwidth. Each of the respective segmented bandwidths may be less than the chirp bandwidth. The example method may include determining a distance to at least a portion of an object based on the processing.

In some examples, producing the interference signal may include directing a transmit portion of a laser beam corresponding to the laser chirp toward the object, and combining a reflected portion of the transmit portion of the laser beam with a local oscillator portion of the laser beam.

In some examples, said processing may include combining results from processing the multiple temporal segments. In some examples, said combining comprises averaging. In some examples, said averaging composes incoherent averaging.

In some examples, the interference signal may include a first interference signal, the first interference signal corresponding to a first laser chirp comprising a first set of multiple temporal segments. Example methods may include producing a second interference signal from the frequency-modulated continuous wave (FMCW) laser radar system. The second interference signal may correspond to a second laser chirp which may include a second set of multiple temporal segments. Example methods may include processing at least one of the first set of temporal segments with at least one of the second set of temporal segments to determine a distance.

In some examples, the at least one of the first set of temporal segments and the at least one of the second set of temporal segments may overlap temporally.

In some examples, the at least one of the first set of temporal segments and the at least one of the second set of temporal segments correspond to same optical frequencies.

In some examples, the first and second sets of temporal segments may correspond to interference signals from different laser beams.

In some examples, the first and second sets of temporal segments correspond to an interference signal from a same laser beam.

In some examples, processing at least one of the first set of temporal segments with at least one of the second set of temporal segments may at least partially compensate for Doppler noise; speckle noise, or combinations thereof.

In some examples, the first and second laser chirps are in opposite directions.

In some examples, an update rate of the FMCW laser radar system is faster than the inverse of the laser chirp duration.

Examples of systems are described herein. Example systems may include at least one laser source configured to provide a chirped laser beam to be directed toward, and at least partially reflected by, an object to provide a reflected laser beam. The at least one laser source may be configured to provide the chirped laser beam chirped over a chirp bandwidth. Example systems may include a detector configured to combine a local oscillator portion of the chirped laser beam and the reflected laser beam to provide an interference signal. Example systems may include at least one processor configured to process multiple temporal segments of the interference signal. Each of the multiple temporal segments may correspond to a respective segmented bandwidth. Each of the respective segmented bandwidths may be less than the chirp bandwidth. The at least one processor may be configured to determine a distance to at least a portion of an object.

In some examples, the at least one laser source comprises a first laser source configured to provide a first laser chirp comprising a first set of temporal segments, and the at least one laser source may additionally comprise a second laser source configured to provide a second laser chirp comprising a second set of temporal segments.

In some examples, the first and second sets of temporal segments do not overlap temporally.

In some examples, at least one of the first set of temporal segments overlaps temporally with at least one of the second set of temporal segments.

In some examples, the at least one processor is configured to combine results from processing multiple temporal segments.

In some examples, the at least one processor is configured to average results from processing multiple temporal segments.

In some examples, the at least one processor is configured to determine a respective distance to the at least a portion of the object based on multiple temporal segments.

In some examples, an update rate of the distance is greater than the inverse of the duration of the laser chirp.

DETAILED DESCRIPTION

Certain details are set forth herein to provide an understanding of described embodiments of technology. However, other examples may be practiced without various of these particular details. In some instances, well-known circuits, control signals, timing protocols, LiDAR system components, automotive components, metrology system components, software operations, and/or other components or operations have not been shown in detail in order to avoid unnecessarily obscuring the described embodiments. Other embodiments may be utilized, and other changes may be made, without departing from the spirit or scope of the subject matter presented here.

Methods and apparatuses described herein may be used to realize higher duty cycle, more robust, and longer range chirped frequency-modulated continuous-wave (FMCW) laser radar (ladar). The terms LiDAR and LADAR may be used interchangeably herein. Examples described herein may be utilized in automotive lidar, where object distances for which range may be desired may exceed one hundred meters with update rates that may exceed 0.2. MHz in some examples. Examples are provided that use broadband chirps that are processed as multiple temporal segments. In some examples, segmenting may reduce the impact of chirp nonlinearities and/or lack of temporal overlap between the return and local oscillator beams at times that may be near the chirp turn-around times. In some examples, segmenting may allow faster update rates and greater measurement duty cycles in some examples.

Figure 1:
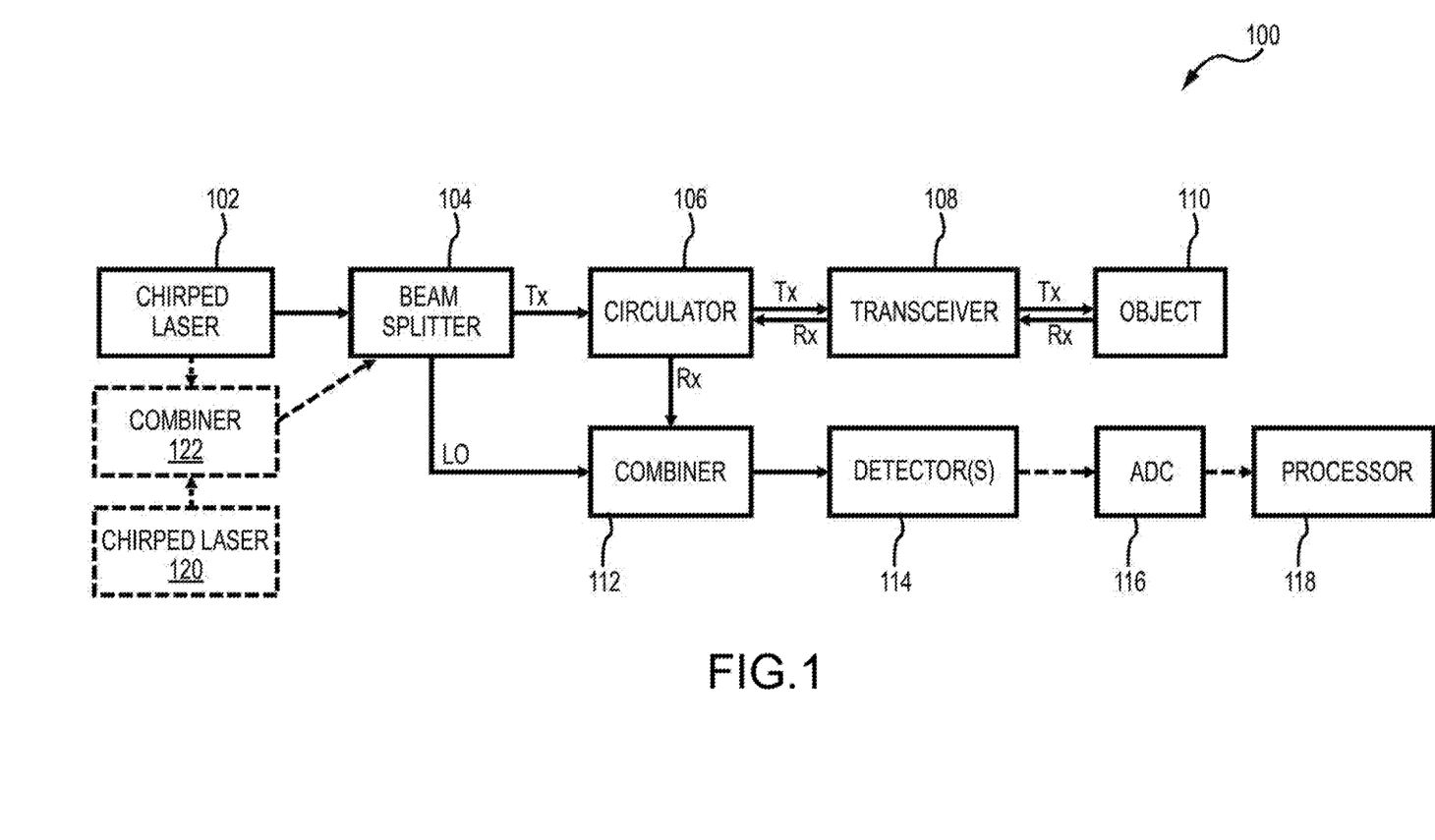
FIG. 1 is a schematic illustration of a system 100 arranged in accordance with examples described herein.

FIG. 1 is a schematic illustration of a system 100 arranged in accordance with one embodiment. The system 100 includes laser source 102, beam splitter 104, circulator 106, transceiver 108, combiner 112, detector 114, digitizer 116 and processor 118. The system 100 may, in some examples, include laser source 120 and combiner 122. The system 100 may be used to measure properties of (e.g., distance to) object 110. The laser source 102 is positioned to provide a laser beam to beam splitter 104. In some examples, two laser sources (e.g., two chirped laser beams) are provided, represented as laser source 102 and laser source 120. The two beams may be combined by the combiner 122 and the combined beam provided to the beam splitter 104. The beam splitter 104 may split the laser beam into a transmit (Tx) beam and a local oscillator (LO) beam. The circulator 106 may receive the transmit beam and provide to transceiver 108. The transceiver 108 may direct the transmit beam toward object 110. The transmit beam may be reflected from object 110. Reflection as used herein may refer to laser beams that are reflected and/or scattered from an object. The reflected laser beam (Rx), which may be referred to as a range return, may be received by transceiver 108. The transceiver 108 may provide the reflected laser beam to the circulator 106. The circulator 106 may provide the reflected laser beam to the combiner 112. The combiner 112 may combine the local oscillator beam and the reflected laser beam to provide a combined beam, which may be directed onto a detector 114. The combined beam detected by the detector 114 may produce an interference signal corresponding to one or more range returns. The interference signal resulting from a range return may be digitized by the digitizer 116 (e.g., an analog to digital converter (ADC)) to provide a digital signal. The digital signal may be processed by processor 118 to determine one or more properties of the object 110 (e.g., distance to the target). The digital signal may be processed to produce signal strength as a function of range, which may be referred to as a range profile. Additional, fewer, and/or different components may be used in some examples.

The system 100 may be a frequency-modulated continuous-wave (FMCW) system, e.g. an FMCW LiDAR system 100, and/or a laser radar (ladar) system.

Examples of systems described herein accordingly may include one or more laser sources, such as laser source 102. Generally, a laser source may produce coherent light (e.g., a laser beam) having a frequency that is often in the optical or infrared portion of the electromagnetic spectrum. Examples of laser sources which may be used include, but are not limited to, semiconductor, optically-pumped semiconductor, and solid-stale laser sources. Laser sources described herein may provide laser beams having a frequency while any frequencies may be used, in some examples, frequencies in the optical or infrared range may be used.

In some examples, systems described herein may include a chirped laser beam. For example, the laser source 102 may provide a chirped laser beam. Accordingly, the laser source 102 may include an actuator which may be coupled to a source of the laser beam which may control a frequency or other parameter (e.g., phase) of the laser beam to provide a chirped laser beam. Examples of actuators which may be used include, but are not limited to, circuitry to control current provided to the laser source (e.g., laser injection current), or a mechanism to change the laser cavity length.

Other actuators may additionally or instead be used. Actuators may be internal or external to and/or external to laser sources. Each chirped laser (e.g., each laser source) may have any number of associated actuators, including 1, 2, 3, or another number of actuators. Generally, a chirping a laser beam or a chirped laser beam may refer to frequency modulation of a laser output (e.g., a frequency modulated laser beam). The frequency modulation may be linear in some examples (e.g., a linear chirp). The laser frequency may be directly chirped via a frequency actuator within the laser, or the frequency chirp may be imparted to the laser frequency by a modulator that may be external to the laser, or the frequency chirp may be generated in any other fashion. Generally, an actuator may be used to modulate or otherwise adjust a frequency of a laser source (e.g., laser source 102 of FIG. 1). Any chirp rate may be used. In some examples, chirp rates of $10^{14}$ Hz/second may be used.

The chirp bandwidth generally refers to a frequency range over which the laser beam is chirped (e.g., a difference between the largest and smallest frequency of the laser beam). Any of a variety of patterns of multiple chirps may be used including, but not limited to, triangle waves and/or sawtooth waves. The chirp rates of multiple chirps may be positive ("up chirp") or negative ("down chirp") and may have the same or different magnitude. Generally, a laser chirp may refer to a temporal portion of a chirped laser beam where the laser frequency or other parameter is swept through a particular bandwidth. Accordingly, a triangle wave chirped laser beam may include a first laser chirp where a frequency is chirped up, followed by a second laser chirp where the frequency is chirped down (or vice versa). An example sawtooth wave chirped laser beam may include a first laser chirp where a frequency is chirped up from a starting frequency to a final frequency (e.g., across a bandwidth), followed by a second laser chirp where the frequency is again chirped up from a starting frequency to the final frequency. A pattern of laser chirps may or may not be repeated.

Examples of systems described herein may utilize any number of chirped lasers. While a single laser source 102 is shown in the example of FIG. 1, in other examples, other numbers of chirped lasers may be used. For example, in FIG. 1, the laser source 102 and the laser source 120 may provide two chirped laser beams. In some examples multiple chirped laser beams be generated by a single laser source. For example a fixed-frequency laser may be modulated by an RF source to produce modulation sidebands and the RF source frequency of the modulation may be chirped to produce multiple chirped laser beams from a single laser source. Certain of the chirped lasers may have different frequencies and/or chirp rates. In some examples, certain of the chirped lasers may have a same frequency and/or chirp rate.

Examples of systems described herein may include one or more splitters, such as beam splitter 104 of FIG. 1. The beam splitter 104 may be used to split one or more laser beams, e.g., from laser source 102, into a portion (a transmit portion, Tx) provided for use in directing toward (e.g., illuminating) an object (e.g., provided to the circulator 106 and transceiver 108 of FIG. 1) and a portion (a local oscillator portion, LO) which may not travel to the object. Generally, any beamsplitter may be used to implement splitters described herein. Beamsplitters may generally be implemented using one or more optical components that may reflect or otherwise couple a portion of a laser beam incident on the beamsplitter into a first path and transmit another potion of the laser beam incident on the beamsplitter into a second path. In some examples, polarizing beamsplitters may be used. Generally, a splitter may provide a portion of its respective incident laser beam to each of multiple paths. Generally, splitters may split incident light in any fractional portion.

Examples of systems described herein may include one or more circulators, such as circulator 106 of FIG. 1. The circulator 106 may be an optical circulator, and may be implemented using a polarization-dependent or polarization independent circulator. An optical circulator may generally provide different outputs such that an input beam may be provided to a first output, and any beam reflected from the first output may be provided to a second output. The circulator 106 may provide the transmit portion (Tx) of a laser beam from beam splitter 104 to the transceiver 108 to be directed toward object 110. The circulator 106 may act to separate a reflected laser beam (Rx) received back from the object 110, and may provide the reflected laser beam, Rx, to combiner 112. A beam splitter or combiner may also be used as a circulator.

Examples of systems described herein may include one or more transceivers, such as transceiver 108 of FIG. 1. The transceiver 108 may be used to direct a laser beam (e.g., the transmit portion Tx of a laser beam from laser source 102 in FIG. 1) toward an object, such as object 110 of FIG. 1. A transceiver may generally direct a laser beam through optical components and/or a reflector and toward an object (e.g., object 110) to interrogate (e.g., illuminate) the object. The laser beam output by the transceiver toward the object may accordingly be based on the output of one or more laser sources, e.g., one or more chirped lasers (e.g., laser source 102 of FIG. 1). The transceiver may be stationary in some examples and may be mobile in some examples. The transceiver may include a beam scanner or other component(s) to spatially scan a laser beam. The transceiver may provide a portion of an incident beam as an output directed toward a partial reflector and an object. In some examples, the partial reflector may reflect a portion of the laser beam received from the transceiver back to other components of the system, which portion may be referred to as a local oscillator (LO) in some examples. The partial reflector may alternatively be placed within or prior to the transceiver and may serve the purpose of the beam splitter and combiner. The object may reflect a portion of the laser beam received from the transceiver back to the transceiver, and the reflected laser beam (e.g., a return or receive portion Rx) may be provided to circulator 106. Laser light returning from the target to circulator 106 may be provided to a combiner 112 to produce an interference signal related to a property of the target (e.g., a distance to the target). The transceiver may be split into a transmitter portion and a receiver portion, which may be spatially separated (e.g., bistatic transceiver). One or more optical paths may be a fiber optic path. A partial reflection from an end of a fiber may act as a beam splitter.

Examples of systems described herein may include one or more combiners, such as combiner 112 of FIG. 1. The combiner 112 may interferometrically combine the local portion of a laser beam (e.g., LO) and a reflected laser beam (e.g., Rx) and direct the interferometric combination onto an optical detector to produce an interference signal. Accordingly, the interference signal may be an electronic signal provided by the detector 114.

Examples of systems described herein may include one or more detectors, such as detector 114 of FIG. 1. The detector may be implemented using any optical detector which may convert an incident interferometric combination into an electronic signal.

Examples of systems described herein may include one or more digitizers, such as digitizer 116 of FIG. 1. The digitizer may receive an interference signal from a detector, which may be an analog or denser digital signal and may convert the interference signal into a digitized signal.

Examples of systems described herein may include one or more processors, such as processor 118 of FIG. 1. The processor may be implemented using one or more signal processors (e.g., circuitry, filters, central processing units (CPUs), processor core(s), digital signal processors (DSPs), application specific integrated circuits (ASICS) and/or other processing elements). In some examples, memory may also be provided, and the processor may execute software (e.g., executable instructions encoded in the memory). The software may include executable instructions for signal processing and or determining one or more properties of the object 110 based on the digitized interference signal.

Examples of systems described herein may accordingly be used to determine one or more properties of an object. Any of a variety of objects may be used. For example, any target and/or surface. Examples include, but are not limited to, automobiles, signs, people, trees, buildings, retro-reflectors, tooling balls, metals, or optical surfaces. Objects may be stationary or may be moving. The term object may be used synonymously with the term target herein. The term surface may also be used. Any of a variety of properties may be determined (e.g., measured) using systems described herein, including distance (e.g., range), velocity and or acceleration. The term distance may be used synonymously with range as described herein. The terms position or location may also be used.

In some examples, the laser source 102 may provide a first chirped laser beam, while the laser source 120 (which may in some examples be implemented using the same laser source 102) may provide a second chirped laser beam. Generally, the chirp rate of the first chirped laser beam may be different than the chirp rate of the second chirped laser beam. In some examples, the first chirped laser beam may be chirped in an opposite direction than the second chirped laser beam. In some examples, the first and second chirped laser beams may be chirped in a same direction. While shown as two sources, in some examples the two chirped laser beams may be provided by a single source. While two chirped laser beams are shown in FIG. 1, any number may be used in other examples, including 3, 4, 5, or 6 laser beams.

The chirped laser beam from laser source 102 and the chirped laser beam from laser source 120 may be combined using combiner 122. The combined beam, including two chirped laser beams, may be provided to the beam splitter 104.

A first interference signal may be provided to digitizer 116 accordingly which is based on the first chirped laser beam (e.g., from laser source 102) and a reflected beam based on a reflection of the first chirped laser beam from object 110. A second interference signal may also be provided to digitizer 116, or a different digitizer, which second interference signal may also include a component based on the second chirped laser beam (e.g., from laser source 120) and a reflection of the second chirped laser beam from object 110. In some examples, the first and second interference signals may be provided as a composite interference signal (e.g., the first and second interference signals may be components of a single interference signal). Accordingly, the digitizer 116 may output frequency signals pertaining to both components. Composite interference signals may be filtered electronically, digitally, or otherwise, to isolate one or more constituent interference signals.

Figure 2A:
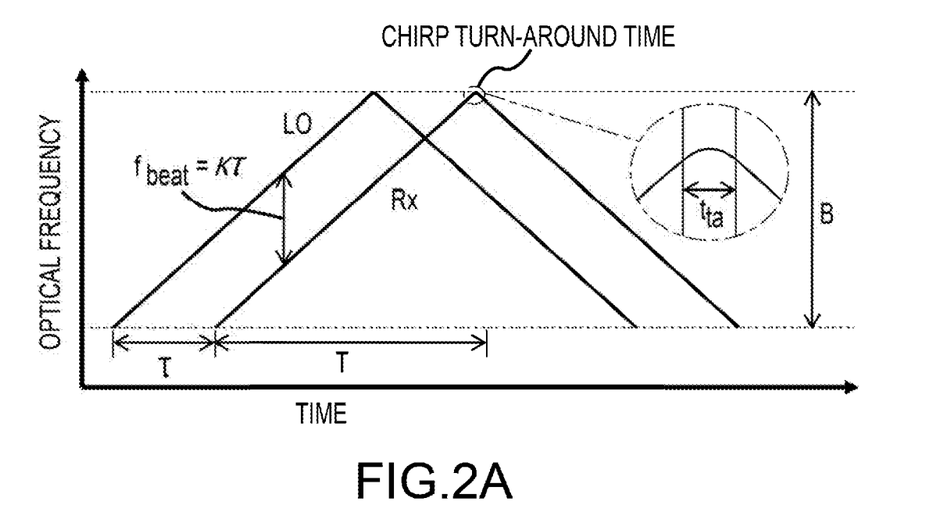
FIG. 2A is an example plot of optical frequency of the LO and Rx signals shown in FIG. 1 over time.
Figure 2B:
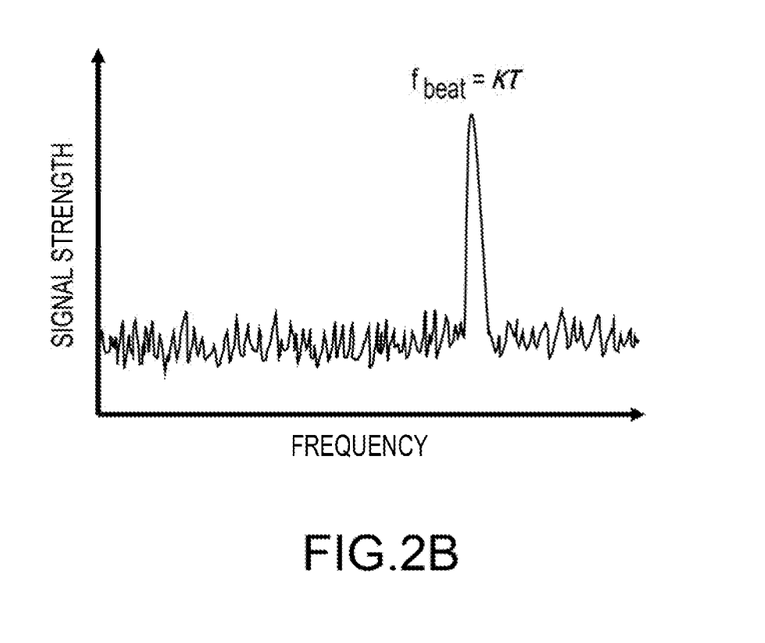
FIG. 2B is an example plot of signal strength of a Fourier transform of an interference signal provided by the system of FIG. 1 arranged in accordance with examples described herein.

FIG. 2A shows an example plot of the LO and Rx optical frequencies as functions of time. In the example of FIG. 2A, both the LO and Rx signals are chirped—e.g., their frequency changes over time and over a bandwidth B. In the example of FIG. 2A a triangle chirp pattern is used (e.g., the beam is linearly chirped up, followed by being linearly chirped down). However, other patterns may be used such as sawtooth (e.g., the beam may be linearly chirped up, then reset to a starting frequency and chirped up again through the bandwidth B). The Rx is time delayed from the LO by a time $\tau$, which may reflect a time taken for the laser beam to travel toward the object, to be reflected from the object, and to return to the transceiver. When combined at combiner 112, the LO and Rx optical fields may interfere to produce an interference signal, which may also be referred to as a beat note. The beat note may be detected by detector 114 and the detector 114 may provide an electrical signal indicative of the beat note (e.g., a voltage, current, or other electrical signal). A Fourier transform of the interference signal (which may be performed, e.g., by processor 118 of FIG. 1 and/or other circuitry), may provide a frequency of the beat note, which may be referred to as a beat frequency. FIG. 2B illustrates an example plot of signal strength vs. frequency for a Fourier transform of an interference signal. The peak shown in FIG. 2B may be at the beat frequency. The beat frequency may be given by $f_{beat}=\kappa\tau$, where $\kappa$ is the chirp rate and $\tau$ may be linearly proportional to the distance of the object (e.g. $\tau=2R/c$, where R is the distance to the object and c is the speed of light). In certain examples, the processor 118 may determine a distance to an object by solving for R and using known or measured values of a chirp rate, the speed of light, and a beat frequency of an interference signal described herein. In certain examples, other processing methods, such as a Hilbert transform, may also or additionally be used in determining a distance to an object. A slope of a phase versus time that may result from a Hilbert transform may be used to determine $f_{beat}$, and thereby a distance to an object, as previously described. Such slope may be determined by a curve fitting operation (e.g. linear fit) in certain examples. Generally, any method may be used to determine a distance to an object based on one or more interference signals.

The example of FIG. 2A and FIG. 2B illustrates a single chirped LO and Rx beam, providing a single beat note in FIG. 2B. In other examples, multiple (e.g., 2) beams may be used, and/or multiple targets may be illuminated, providing multiple beat notes in FIG. 2B.

While FMCW ladar systems offer advantages, they have also exhibited challenges, limitations, and problems. For example, nonlinearities in the frequency chirps or other anomalies may occur near the chirp turn-around times (e.g. at times when the chirp rate changes, such as from increasing to decreasing, or vice versa), or chirp reset times in a sawtooth pattern (e.g., when the chirp returns to a lower frequency from a high end of the bandwidth, B, or vice versa). These nonlinearities or other anomalies may reduce the usable temporal duration of the chirp. Chirp nonlinearities near the chirp turn-around times may be particularly challenging when using active electronic feedback to linearize the chirp because there may be a "reacquisition" time for the electronic feedback to become sufficiently effective near the chirp turn-around time. An example of chirp nonlinearities that may exist near the chirp turn-around time are shown in the inset in FIG. 2(a), where chirp nonlinearities exist during a time $t_{ta}$. If a reacquisition time is, for instance, 5 µs, then the chirp may be insufficiently linear for 5 µs, which may prohibit the use of chirps with durations, T, of 5

μs or shorter for this example. This problem may therefore prohibit update rates faster than 1/5 μs=200 kHz for this example. Another problem in some examples may be that, for sufficiently distant objects, the time delay, τ, between the Rx and the LO may be sufficiently large that less than a desired portion of the LO up chirp overlaps temporally with the Rx up chirp. In some examples, for sufficiently distant objects, the time delay, τ, between the Rx and the LO may be comparable or greater than the chirp duration. T. For these, and possibly other examples, the Rx and LO may not sufficiently overlap in time (where the overlap time may equal to T−τ) which may adversely affect the interference signal update rate, signal-to-noise ratio (SNR), the measurable range, or the achievable range resolution. The SNR may be adversely affected because the temporal duration of overlap between the Rx and LO up chirp waveforms, for instance, may be reduced, which may decrease the effective integration time to T−τ, which may result in greater noise. The range resolution may be adversely affected because the bandwidth over which the Rx and LO up chirp waveforms, for instance, overlap may be reduced to $\kappa*(T-\tau)$. Another way of expressing this may be that the duty cycle for the measurement, or the fraction of useful measurement time compared to the overall measurement time, may be undesirably small. Due to reductions in SNR and/or bandwidth for decreasing duty cycle, the measurable range to an object may be limited if a desired update rate is maintained. Also, if a measurable range to a target is maintained, then it may appear necessary to reduce the update rate (1/T) in order to preserve the SNR and/or range resolution.

Figure 3:
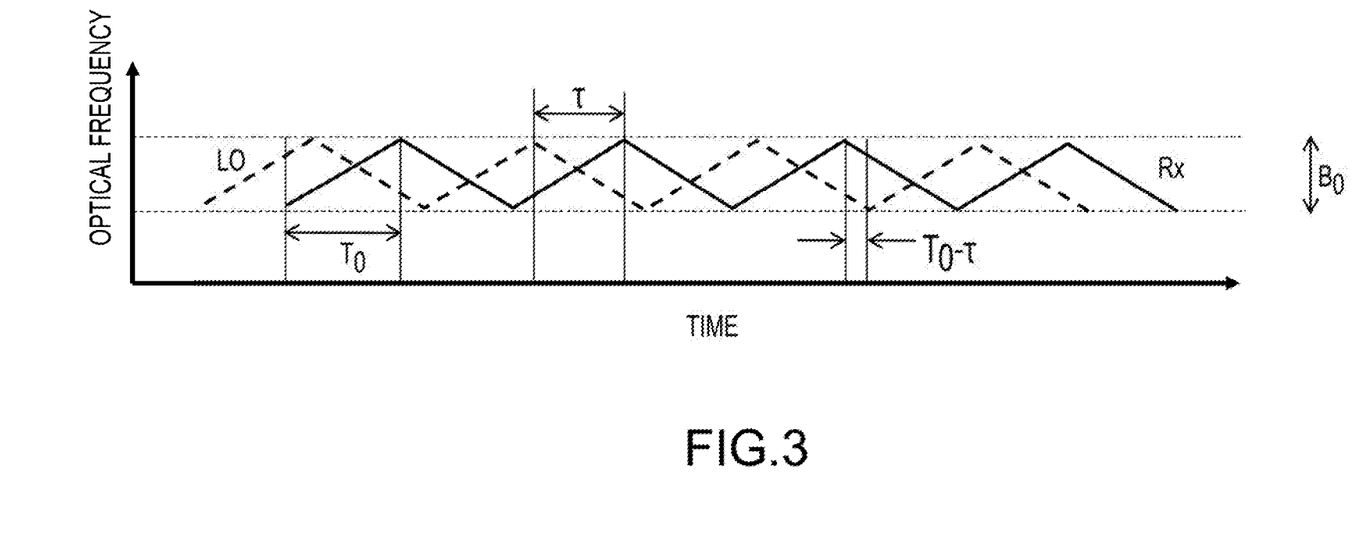
FIG. 3 is a plot of optical frequency over time for an Rx and LO beam arranged in accordance with examples described herein.

FIG. 3 is a plot of optical frequency over time for an Rx and LO beam arranged in accordance with examples described herein. In the example of FIG. 3, a desired chirp bandwidth $B_0$ is used (e.g. to achieve a desired range resolution $\Delta R_0$), but the range delay τ is nearly as large as the chirp duration $T_0$. Accordingly, the useful measurement time, which may be expressed by $T_0-\tau$, may be unacceptably small. The useful measurement time may refer to times during which both the Rx and LO beams are linearly chirped in a same direction. In the example of FIG. 3, the duty cycle (e.g., ratio of useful measurement time to total time) is $(T_0-\tau)/T_0$, which is significantly less than unity. In the example of FIG. 3, the useful chirp bandwidth is also significantly less than $B_0$ since the interference signal is only generated for a time of $T_0-\tau$ instead of $T_0$. Accordingly, the example of FIG. 3 illustrates limitations which may exist in some FMCW laser radar or other optical systems.

Examples described herein may in some examples improve the duty cycle of FMCW ladar measurements. Examples of methods and apparatuses described herein may segment a broader bandwidth frequency chirp may into multiple smaller chirps (e.g., temporal segments) and may be processed the temporal segments of the chirps (e.g., temporal segments of an interference signal), which may improve performance and/or enable the detection of objects at longer ranges in some examples.

Accordingly, examples of systems and methods described herein may segment the processing of a broader bandwidth frequency chirp into multiple shorter-duration (e.g., lower bandwidth) frequency chirps. This segmentation may have the benefits it some examples of improving the measurement duty cycle and range resolution, and/or allowing for more flexible processing, and/or enabling improved detection of more distant objects.

Figure 4A:
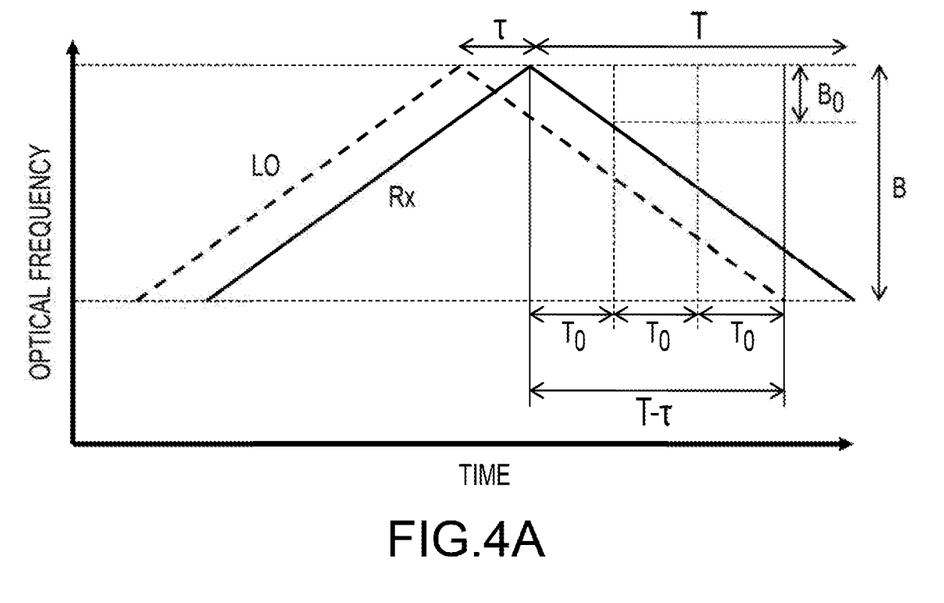
FIG. 4A is a plot of optical frequency over time for an Rx and LO beam arranged in accordance with examples described herein.
Figure 4B:
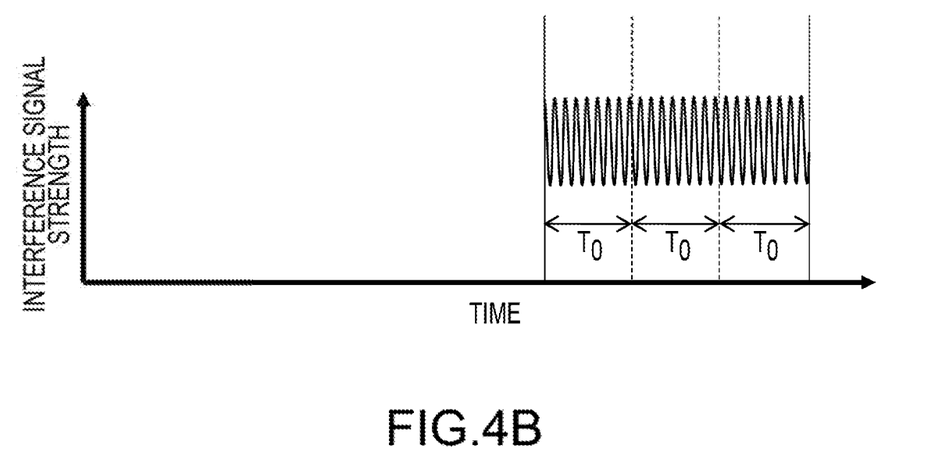
FIG. 4B is a plot of interference signal strength over time for the example shown in FIG. 4A.

FIG. 4A is a plot a optical frequency over time for an Rx and LO beam arranged in accordance with examples described herein. FIG. 4B is a plot of interference signal strength over time for the example shown in FIG. 4A. The example in FIG. 4(a) shows a frequency chirp configuration where the range delay, τ, is the same as that for FIG. 3, but the bandwidth, B, is greater, and chirp duration, T, is longer (e.g., the chirp rate is maintained compared to FIG. 3 in this example). The LO beam in FIG. 4A may, for example, be the LO beam provided from beam splitter 104 to combiner 112 in FIG. 4. The Rx beam in FIG. 4A may, for example, be the Tx beam reflected (e.g., scattered) from object 110 of FIG. 1 and received at transceiver 108.

Examples of methods and systems described herein may process multiple temporal segments of an interference signal. Each of the temporal segments may have a bandwidth (e.g., a segmented bandwidth) which is less than the total bandwidth of the Rx and/or LO chirp bandwidth. Any number of temporal segments may be used including 2, 3, 4, 5, 6, 7, 8, 9, 10, or another number of temporal segments. One or more processors, such as the processor 118 of FIG. 1, may determine a distance to an object for one or more temporal segment of the interference signal. A distance to an object may be determined by any of a variety of methods including those involving determining a beat note frequency corresponding to a certain temporal segment of an interference signal, in which a distance to an object may be determined with knowledge of the chirp rate. A frequency may be determined by any method including, but not limited to curve fitting, peak finding, fringe counting, and/or slope determination (e.g. for Hilbert transforms).

Referring again to FIG. 4A, the broader bandwidth (B) chirp may be processed in multiple (e.g., three shown in FIG. 4A) segments such that each chirp segment duration, $T_0$, may be the same as that for the proposed measurement (e.g. corresponding to the inverse of the desired update rate) shown in FIG. 3 (e.g., the update rate is maintained for this example, compared to FIG. 3). For the example shown in FIG. 4A, the useful interference signal that may be measured on a detector and digitized may be of temporal duration T−τ. This interference signal may be segmented into smaller-duration interference signal segments with durations $T_0$ (e.g., each having a smaller bandwidth $B_0$, which bandwidth may correspond to the desired range resolution, and is maintained for this example, compared to FIG. 3). These smaller temporal chirp segments may each be processed (e.g., by processor 118 of FIG. 1) to determine a range to an object. By utilizing a broader-bandwidth chirp, and thus reducing the occurrences of chirp turn-arounds compared to the example shown in FIG. 3, a greater portion of the overall chirps are useful, and the measurement duty cycle is greater. Thus, distant objects may be measured without significantly compromising the update rate or chirp bandwidth.

FIG. 4B is a plot of an example temporal interference signal resulting from the chirp configuration in FIG. 4A that may be segmented for processing. The processing of each segment of temporal duration $T_0$ may include a transform (e.g., a fast Fourier Transform, Hilbert Transform) and/or any other processing of the interference signal or segment thereof. Accordingly, referring back to FIG. 1, the processor 118 may be configured to process (e.g., independently process) temporal segments of an interference signal provided from the detector 114 and/or digitizer 116. Accordingly, a transform may be taken (and/or other processing performed) of multiple portions of an interference signal, each portion corresponding to a segmented bandwidth which may be less than a total chirp bandwidth provided by laser source 102 and/or laser source 120.

The processing of temporal segments may occur in a variety of ways. In some examples, a processor may not process all segments. In some examples, the processing of segments may result in more than one determination of a range to an object. For example, one or more processors (e.g., processor 118 of FIG. 1) may determine a range to an object based on each segment. So, in an example where three temporal segments of an interference signal are processed, three range determinations may be made in some examples. In some examples, multiple processed or unprocessed segments may be combined (e.g., averaged, summed, or differenced) by one or more processors (e.g., by processor 118 of FIG. 1). Combining or averaging of interference signals to determine a range may occur in any sequence or order. For example, the range determinations for each of multiple segments may be averaged to determine an average range determination. Additionally or instead, the digitized interference signals may be averaged in the processor 118 in any step of processing, and then an average determination of range may be produced. The combination (e.g., averaging) may occur either coherently (e.g., with consideration for the phase of the interference signal) or incoherently (e.g., without consideration for the phase of the interference signal). Coherent combining may, for some examples, include summing interference signals at any stage of processing, in the time domain or frequency domain, whereby the interference signal phases are included in the sum. Incoherent combining may, in some examples, include summing magnitudes (or magnitudes squared) of interference signals at any stage of processing, in the time domain or frequency domain. Incoherent combining (e.g. averaging) may advantageously improve range precision in the presence of speckle.

For the example of FIG. 4A, the resolution achieved may be $c/2B_0$, which may in some examples be better than the case in FIG. 3 due in part to the poor temporal overlap between the Rx and LO for the example in FIG. 3. Accordingly, examples of systems and methods described herein may have a resolution which is based on the segmented bandwidth (e.g., a segmented portion of a total chirp bandwidth) corresponding to a temporal segment of an interference signal that may be processed by one or more processors to determine a distance to at least a portion of an object. Moreover, the duty cycle of the measurement in the example of FIG. 4A may be $(T-\tau)/T$ rather than $(T_0-\tau)/T_0$ for the example in FIG. 3. Accordingly, examples of systems and methods described herein may have a duty cycle which is based on a total laser chirp and a single delay time, where the total laser chirp may be used to produce multiple distance measurements (e.g., each corresponding to a temporal segment of the chirp). Examples of FMCW systems and methods described herein (e.g., system 100 of FIG. 1) may have an update rate of the FMCW laser radar system which is faster than the inverse of the laser chirp duration. For example, the update rate may be related to the length of the temporal segment, which may be shorter than the laser chirp duration. Also note, for the example in FIG. 3, if the system is used for longer object ranges or shorter chirp durations, such that $T_0<\tau$, the LO and Rx portions may not be temporally overlapped at all, which may result in little or no capability to accurately detect an object. Systems and methods described herein may address this limitation in some examples at least because it may be more likely to have significant temporal overlap between the similar LO and Rx portions for shorter chirp durations or for longer object ranges.

Examples of methods described herein may accordingly include producing an interference signal from a frequency-modulated continuous wave (FMCW) laser radar system, such as the system shown in FIG. 1 (e.g., an interference signal provided by the detector 114). The interference signal may correspond to a laser chirp over a chirp bandwidth. For example, referring to FIG. 4A, an interference signal may be provided by an FMCW laser radar system that may correspond to the down chirp of the LO and RX signals over the chirp bandwidth B. The interference signal strength is shown in FIG. 4B, and the interference signal may be usable for determining distances during a time the LO and RX beams overlap (e.g., when both are chirping in the same direction). In the example of FIG. 4A and FIG. 4B, during the downward chirp of the LO and RX beams, the interference signal may be usable for the time $T-\tau$ shown.

Methods may also include processing multiple temporal segments of the interference signal (e.g., using one or more processors, such as the processor 118 of FIG. 1) for one or more laser chirps. Each of the multiple temporal segments may correspond to a respective segmented bandwidth, and each of the respective segmented bandwidths may be less than the chirp bandwidth. In the example of FIG. 4A, the three multiple temporal segments $T_0$ are shown, each corresponding to a segmented bandwidth $B_0$. Each of the temporal segments $T_0$ may be used to determine (e.g., by the processor 118 of FIG. 1) a distance to at least a portion of an object.

Accordingly, methods described herein may process multiple temporal segments of an interference signal for one or more (e.g., each) laser chirp. If multiple laser chirps produce interference signals, the multiple laser chirps may overlap temporally (e.g. two different lasers chirped simultaneously) or may not overlap temporally (e.g. sequential chirps of a single laser).

In some examples, more than one laser beam may be used (e.g., the laser source 102 and the laser source 120 of FIG. 1) for a range measurement. For example, an FMCW laser radar system may utilize multiple laser beams. Measurements using multiple laser beams may be used, for example, to wholly and/or partially compensate for Doppler errors or speckle noise, or may be used to determine object speed in the direction of the incident laser beam. In systems utilizing multiple laser beams, multiple interference signals may be produced (e.g., by detector 114 of FIG. 1), at least one interference signal corresponding to each of the multiple laser beams. Examples of systems and methods described herein may process multiple temporal segments of each of the interference signals (e.g., using processor 118 of FIG. 1). In examples utilizing multiple laser beams, the processed temporal segments of multiple interference signals corresponding to each laser may coincide in time (wholly and/or partially). For example, a first interference signal corresponding to a first laser beam may have a temporal segment which may correspond in time with a temporal segment of a second interference signal corresponding to a second laser beam. In some examples, temporal segments of multiple interference signals which coincide and/or overlap in time may be processed together (e.g., by processor 118 of FIG. 1). Processing temporal segments together from multiple interference signals corresponding to multiple laser beams may wholly and/or partially compensate for Doppler errors and/or speckle noise, or may be used to determine object speed in the direction of the incident laser beam. Processing of multiple temporal segments to compensate for Doppler errors and/or speckle noise may be performed by averaging the beat note frequency from an interference signal segment from an up chirp with the beat note frequency from an interference signal segment from a down chirp, for instance. For this and other examples, the interference signal segments may or may not overlap in time. The average beat note $f_{beat}$ may, with a known chirp rate, be used to determine a corrected distance as previously described or using other methods. Processing of multiple temporal segments to determine an object velocity may be performed by differencing the beat note frequency from an interference signal segment from an up chirp with the beat note frequency from an interference signal segment from a down chirp. For this and other examples, the interference signal segments may or may not overlap in time. Other variations of this calculation, including using same or different chirp rate magnitudes and same or different chirp directions (e.g. up chirp versus down chirp), may also be used. In some examples, interference signal segments that do not coincide in time may also be processed together.

In some example systems or methods, temporal segments of interference signals from different chirps may be processed together. For example, temporal segments of interference signals corresponding to similar (e.g., identical) optical frequencies may be processed together (e.g., by processor 118 of FIG. 1). For example, the start of an "up" chirp and the end of a "down" chirp may both correspond to similar (e.g., identical) optical frequencies (e.g. corresponding to the up and down chirps shown in FIG. 2A). It may therefore be desirable to process temporal segments of interference signals corresponding to multiple regions of similar optical frequency together, which may mitigate problems resulting from effects such as dispersion and/or speckle in some examples. The multiple temporal segments of interference signals used for processing may comprise segments corresponding to similar (e.g. identical) frequencies of sequential laser chirps, and may comprise segments corresponding to opposite chirp rates.

Figure 5:
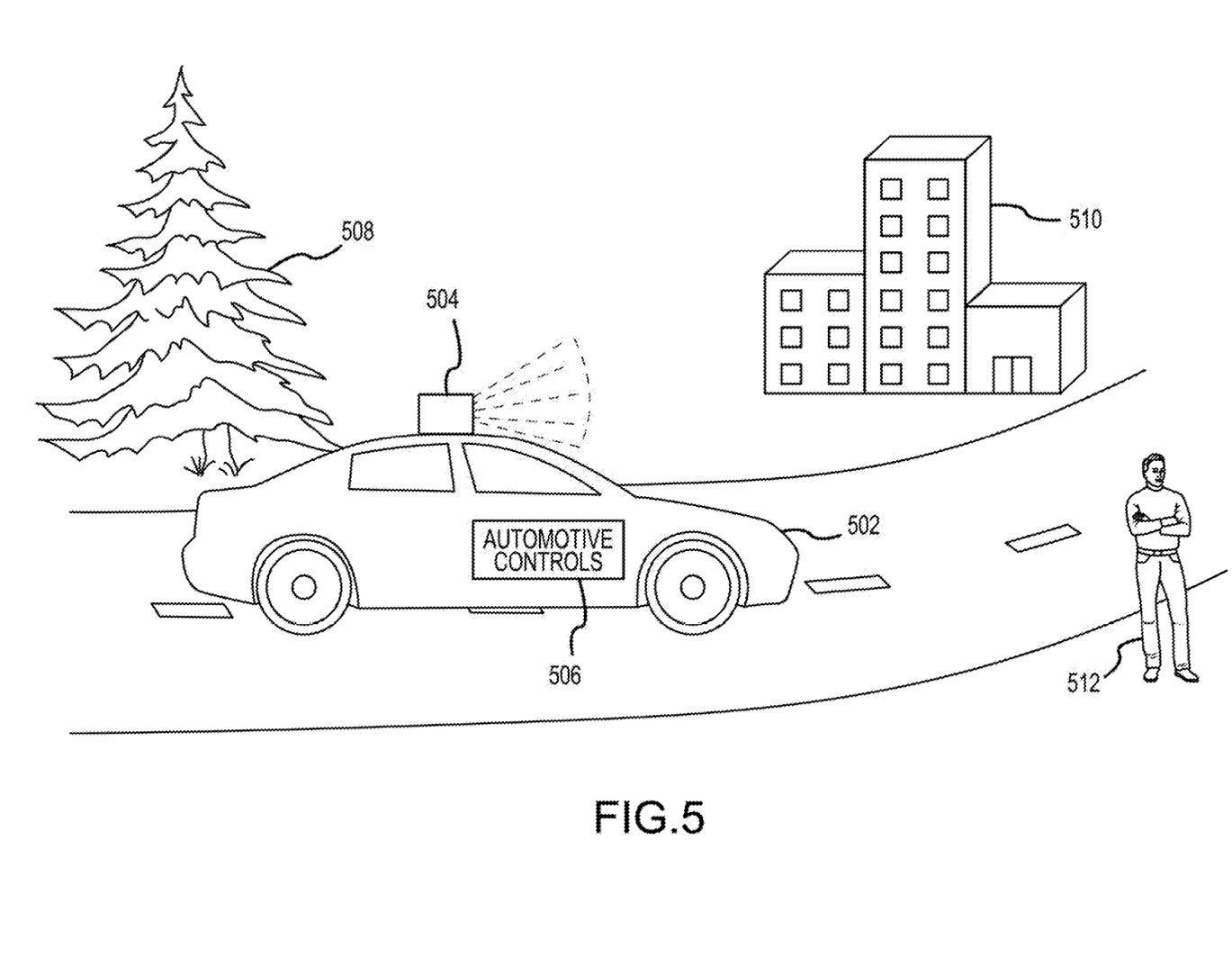
FIG. 5 is a schematic illustration of an automotive LiDAR application arranged in accordance with examples described herein.

FIG. 5 is a schematic illustration of an automotive LiDAR application arranged in accordance with examples described herein. The LiDAR application includes automobile 502, lidar system 504, automotive controls 506, tree 508, building 510, and person 512. Additional, fewer, and/or different examples may be used.

LiDAR systems described herein, such as system 100, may be used to implement lidar system 504. The lidar system 504 may implement methods described herein, including processing temporal segments of a chirp bandwidth, each of the temporal segments corresponding to a smaller segmented bandwidth. While shown as an automobile 502, other moving objects may make use of lidar system 504 in other examples. For example, an aircraft, drone, helicopter, boat, and/or bicycle may be used.

Automotive LiDAR applications may provide a LiDAR system, such as lidar system 504 on, in, and/or in communication with an automobile, such as automobile 502. The lidar system 504 is depicted mounted on a roof of automobile 502, however other positions may be used (e.g., in the dash, under the hood). The lidar system 504 may direct one or more laser beams toward targets in the scene.

Any number or kind of objects (e.g., surfaces) may be measured using LiDAR systems described herein, including tree 508, building 510, and/or person 512. In some examples, objects may include other automobiles, aircraft, drones, etc. Accordingly, LiDAR systems described herein may provide distance measurements for multiple objects in a scene.

The automotive controls 506 may be in communication with the lidar system 504 to configure, start, stop, and/or interact with the lidar system 504. The automotive controls 506 may additionally or instead receive an output of the lidar system 504 and take action based on the output, including to change speed and/or heading.

Distance and/or velocity measurements described herein may be used by the automotive controls 506 to, for example, develop a 3D map of a scene. With a 3D map of the scene, more accurate commands and control may be provided by the automotive controls 506. In some examples the 3D map, distance, and/or velocity measurements may be displayed to a driver of the automobile 502 and/or other individuals in communication with the lidar system 504. In some examples (e.g., in autonomous and/or semi-autonomous vehicle operation), the automotive controls 506 may cause the automobile 502 to start, stop, turn, change direction, speed up and/or slow down based on the distance measurements and/or 3D map of the scene.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and or received directly from the recited components without intervening components, but also may be provided to and/or received from the certain components through intervening components.

What is claimed is:

1. A method comprising:
producing an interference signal from a frequency-modulated continuous wave (FMCW) laser radar system, the interference signal corresponding to a laser chirp over a chirp bandwidth;
processing multiple temporal segments of the interference signal, each of the multiple temporal segments corresponding to a respective segmented bandwidth, each of the respective segmented bandwidths being less than the chirp bandwidth; and
determining a distance to at least a portion of an object based on the processing, wherein an update rate of the FMCW laser radar system is faster than the inverse of the laser chirp duration.

2. The method of claim 1, wherein producing the interference signal comprises:
directing a transmit portion of a laser beam corresponding to the laser chirp toward the object; and
combining a reflected portion of the transmit portion of the laser beam with a local oscillator portion of the laser beam.

3. The method of claim 1, wherein said processing comprises combining results from processing the multiple temporal segments.

4. The method of claim 3, wherein said combining comprises averaging.

5. The method of claim 4, wherein said averaging comprises incoherent averaging.

6. The method of claim 1, wherein the interference signal comprises a first interference signal, the first interference signal corresponding to a first laser chirp comprising a first set of multiple temporal segments, the method further comprising producing a second interference signal from the frequency-modulated continuous wave (FMCW) laser radar system, the second interference signal corresponding to a second laser chirp comprising a second set of multiple temporal segments; and processing at least one of the first set of multiple temporal segments with at least one of the second set of multiple temporal segments to determine the distance.

7. The method of claim 6, wherein the at least one of the first set of multiple temporal segments and the at least one of the second set of multiple temporal segments overlap temporally.

8. The method of claim 6, wherein the at least one of the first set of multiple temporal segments and the at least one of the second set of multiple temporal segments correspond to same optical frequencies.

9. The method of claim 6, wherein the first and second sets of multiple temporal segments correspond to interference signals from different laser beams.

10. The method of claim 6, wherein said processing at least one of the first set of multiple temporal segments with at least one of the second set of multiple temporal segments at least partially compensates for Doppler noise, speckle noise, or combinations thereof.

11. The method of claim 6, wherein the first and second laser chirps are in opposite directions.

12. A method comprising:
producing an interference signal from a frequency-modulated continuous wave (FMCW) laser radar system, the interference signal corresponding to a laser chirp over a chirp bandwidth, wherein the interference signal comprises a first interference signal, the first interference signal corresponding to a first laser chirp comprising a first set of multiple temporal segments;
producing a second interference signal from the frequency-modulated continuous wave (FMCW) laser radar system, the second interference signal corresponding to a second laser chirp comprising a second set of multiple temporal segments;
processing multiple temporal segments of the interference signal, each of the multiple temporal segments corresponding to a respective segmented bandwidth, each of the respective segmented bandwidths being less than the chirp bandwidth;
determining a distance to at least a portion of an object based on the processing; and
processing at least one of the first set of multiple temporal segments with at least one of the second set of multiple temporal segments to determine the distance, wherein the first and second sets of multiple temporal segments correspond to an interference signal from a same laser beam.

13. A system comprising:
at least one laser source configured to provide a chirped laser beam to be directed toward, and at least partially reflected by, an object to provide a reflected laser beam, wherein the at least one laser source is configured to provide the chirped laser beam chirped over a chirp bandwidth;
a detector configured to combine a local oscillator portion of the chirped laser beam and the reflected laser beam to provide an interference signal; and
at least one processor configured to process multiple temporal segments of the interference signal, each of the multiple temporal segments corresponding to a respective segmented bandwidth, each of the respective segmented bandwidths less than the chirp bandwidth, and determine a distance to at least a portion of the object, wherein the at least one processor is configured to determine the distance to the at least a portion of the object at an update rate, and wherein the update rate is greater than the inverse of the duration of the laser chirp.

14. The system of claim 13, wherein the at least one laser source comprises a first laser source configured to provide a first laser chirp comprising a first set of temporal segments, and wherein the at least one laser source additionally comprises a second laser source configured to provide a second laser chirp comprising a second set of temporal segments.

15. The system of claim 14, wherein the first and second sets of temporal segments do not overlap temporally.

16. The system of claim 14, wherein at least one of the first set of temporal segments overlaps temporally with at least one of the second set of temporal segments.

17. The system of claim 13, wherein the at least one processor is configured to combine results from processing multiple temporal segments.

18. The system of claim 17, wherein the at least one processor is configured to average results from processing multiple temporal segments.

19. A system comprising:
at least one laser source configured to provide a chirped laser beam to be directed toward, and at least partially reflected by, an object to provide a reflected user beam, wherein the at least one laser source is configured to provide the chirped laser beam chirped over a chirp bandwidth;
a detector configured to combine a local oscillator portion of the chirped laser beam and the reflected laser beam to provide an interference signal; and
at least one processor configured to process multiple temporal segments of the interference signal, each of the multiple temporal segments corresponding to a respective segmented bandwidth, each of the respective segmented bandwidths less than the chirp bandwidth, and determine a distance to at least a portion of the object wherein the at least one processor is configured to combine results from processing multiple temporal segments, wherein the at least one processor is configured to determine a plurality of initial distances to the at least a portion of the object, wherein each of the plurality of initial distances is based on a respective one of the multiple temporal segments, and wherein the at least one processor is configured to determine the distance to the at least at least a portion of the object based on combining the plurality of initial distances.

* * * * *